UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF MAKING AMMONIA.

1,053,951. Specification of Letters Patent. Patented Feb. 18, 1913.

No Drawing. Application filed September 19, 1911. Serial No. 650,245.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in the Process of Making Ammonia, of which the following is a specification.

We have found that we can obtain ammonia in considerable quantity by passing a mixture of, or containing, nitrogen and hydrogen in contact with metallic molybdenum, or a suitable compound thereof, either directly, or after treatment before the introduction thereof into the contact tube, or furnace. For instance, a molybdenum oxid, or a molybdenum chlorid, or an ammonium molybdate, or such a compound as a carbid, nitrid, amid, or hydrid, of molybdenum may be employed. It is probable that, during the passing of the nitrogen and hydrogen over the molybdenum, or the compound of molybdenum, the molybdenum or compound thereof may undergo some change, for instance molybdenum oxid would, by the current of nitrogen and hydrogen, or by any ammonia already formed in the gases, be reduced to metallic molybdenum, or to a nitrid thereof, or any metallic molybdenum employed may combine with more or less nitrogen and form a nitrid, or an amid, imid, or the like, may be formed.

If desired, the molybdenum, or the compound thereof, can be employed in conjunction with other catalytic agent or agents, such for instance as nickel, or in admixture with an indifferent substance, such for instance as carbon, or the molybdenum, or compound thereof, can be precipitated on to any suitable carrier, such for instance as quartz, chamotte, or meerschaum.

Suitable temperatures for carrying out the process of our invention lie between about 300° and 900° C.

The following is an example of how our invention can be carried into practical effect, but the invention is not confined to this example. Heat ammonium molybdate, or ammonium phosphomolybdate, or molybdic acid, in a current of pure gaseous ammonia, to a dark red heat and then introduce into a contact tube the molybdenum-nitrogen compound thus produced and pass a current of nitrogen and hydrogen, in combining proportions, through the tube at a temperature of five hundred and fifty degrees centigrade and at a pressure of one hundred atmospheres. The ammonia, which is contained in the gases leaving the contact tube, may be separated therefrom in any suitable manner. In this example, if desired, the initial materials may be introduced directly into the contact tube and any alteration of such initial material be allowed to take place in the said contact tube.

Now what we claim is:—

1. The process of producing ammonia by passing gases containing nitrogen and hydrogen over a catalyst containing molybdenum and maintained at a temperature of between about 300° and 900° C.

2. The process of producing ammonia by passing gases containing nitrogen and hydrogen under pressure over a catalyst containing molybdenum at a temperature of between about 300° and 900° C.

3. The process of producing ammonia by passing a mixture of nitrogen and hydrogen over a catalyst containing molybdenum at a pressure above one hundred atmospheres and at a temperature of between about 300° and 900° C.

4. The process of producing ammonia by passing gases containing nitrogen and hydrogen over a catalyst containing molybdenum and nickel under pressure and at a temperature of between about 300° and 900° C.

5. The process of producing ammonia by passing gases containing nitrogen and hydrogen over a catalyst containing molybdenum and nickel at a pressure above one hundred atmospheres and at a temperature of between about 300° and 900° C.

In testimony whereof we have hereunto set our hands in the presence of two subscribing witnesses.

CARL BOSCH.
ALWIN MITTASCH.

Witnesses:
J. ALEC. LLOYD,
JOSEPH HEIFFER.